INVENTOR.
ROBERT E. BELL

Dec. 13, 1966 R. E. BELL 3,291,232
COMPUTING, PRINTING AND LOGGING
WEIGHING SCALE SYSTEM
Original Filed April 30, 1964 4 Sheets-Sheet 2

INVENTOR.
ROBERT E. BELL
BY
Thomas H. Grafton
ATTORNEY

INVENTOR.
ROBERT E. BELL
BY
Thomas H. Grafton
ATTORNEY

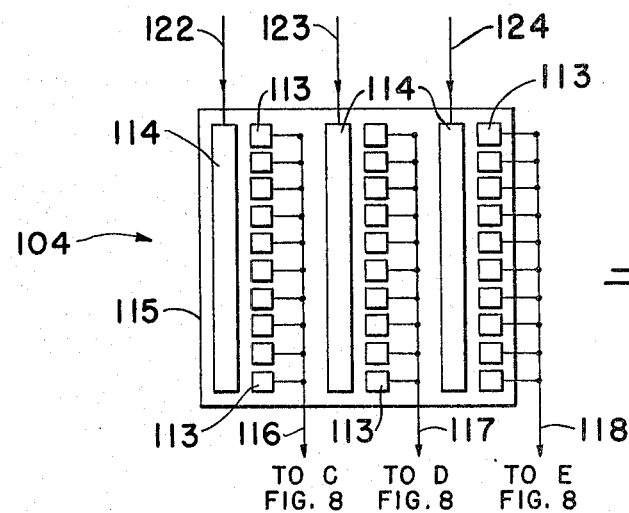
_Fig-7_
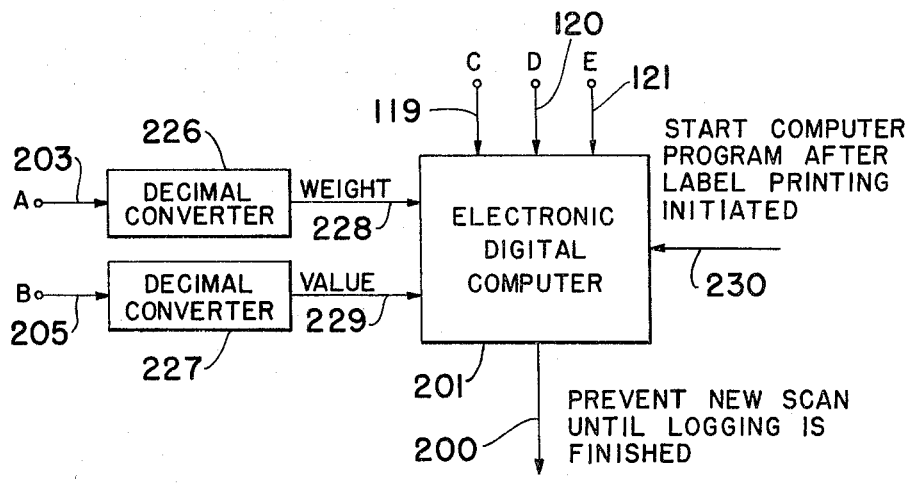
_Fig-8_
INVENTOR.
ROBERT E. BELL
BY
Thomas H. Grafton
ATTORNEY

United States Patent Office 3,291,232
Patented Dec. 13, 1966

3,291,232
COMPUTING, PRINTING AND LOGGING
WEIGHING SCALE SYSTEM
Robert E. Bell, Toledo, Ohio, assignor to Toledo Scale Corporation, Toledo, Ohio, a corporation of Ohio
Continuation of application Ser. No. 363,856, Apr. 30, 1964. This application Mar. 3, 1966, Ser. No. 536,536
9 Claims. (Cl. 177—3)

This application is a continuation of U.S. application Serial No. 363,856 filed April 30, 1964, in the name of Robert E. Bell, now abandoned.

This invention relates to electrical and electronic computing weighing scales and more particularly to commodity plate selection of address for data logging means coupled to such a scale.

The commodity plate selection of address is especially useful in retail computing weighing scales of the type disclosed in U.S. Patent No. 3,055,585, issued September 25, 1962, in the names of R. E. Bell and R. B. Williams Jr., having means for computing the money value of a package of goods according to the weight of that particular package and the price per unit of weight of the material. Such retail computing scale prints the price per unit of weigh by means of printing wheels or sectors, one for each digit or place in the price, which are set up by manually operated knobs. These knobs also set up the price factor in the computer by operating selector switches operatively connected to the computer. The computer computes the above money value of the package of goods and the scale prints a ticket, label or the like bearing thereon such money value and such selected price together with the net weight, date, store code, commodity name, and commodity grade. The commodity name and grade are printed from printing plates as shown and described in U.S. Patent No. 2,953,989, issued September 27, 1960, in the name of T. W. Gittus.

Although it is desirable to ascertain the weight and retail value of all the packages of a certain kind or class of commodity, the retail computing scale described above included no means for doing this. For example, the operator of a food store who has taken delivery of a certain number of pounds of sides of beef in his cutting and packaging room would like to know the total weight and retail value of all the packages of rib steaks, chuck roasts, etc. into which the sides of beef are packaged.

Accordingly, the objects of this invention are to improve weighing scales, to provide automatically operable means for logging data relating to the commodities being processed by such scales, and to provide commodity plate selection of address for data logging means coupled to such scales, the name of the commodity being processed corresponding to the address for data logging.

One embodiment of this invention enabling the realization of these objects is a combination of first means for weighing a commodity, computing the value of the commodity according to its weight and a selected price and recording the value, printing type for printing the name of the commodity, second means for logging data, such as weight and value, made available by the first means relating to the commodity, the name of the commodity corresponding to the address for data logging, and a commodity name plate for both setting up the printing type and selecting the address for the second means. The data logging means reads out on command the weight and retail value of all the packages of a certain kind or class of commodity. For example, the data logging means lists and adds the number of pounds and the retail value of all the rib steaks processed by the computing weighing scale system in an eight hour period.

In accordance with the above, a feature of this invention resides in both setting up the commodity name printing type and selecting the address for the data logging means by inserting the commodity name plate into the computing and recording means. The operator, by merely placing in the computing scale the "Sirloin Steak" commodity printing plate, automatically sets up the printer to print "Sirloin Steak" and selects the correct discrete logging location in the data logging means for listing the weight and retail value of all the packages processed by the system during the time that the "Sirloin Steak" commodity printing plate remains in the scale.

The above and other objects and features of this invention will be appreciated more fully from the following detailed description when read with reference to the accompanying drawings wherein.

Figure 1:
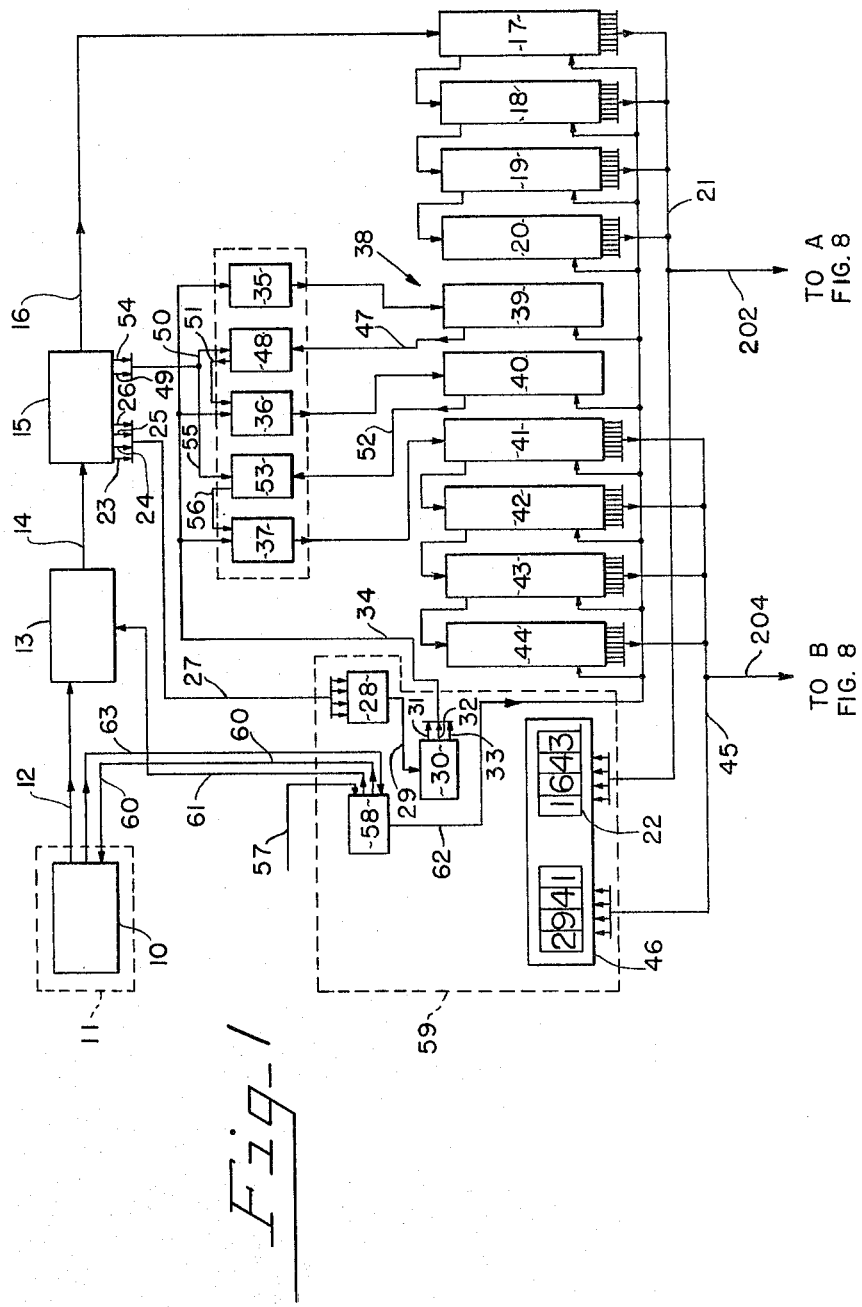
FIG. 1 is a schematic block diagram illustrating the general organization of an electronic weighing scale and mechanism for reading the scale and indicating such reading in digital form and also multiplying such reading by an arbitrarily selected factor and indicating the product.
Figure 2:
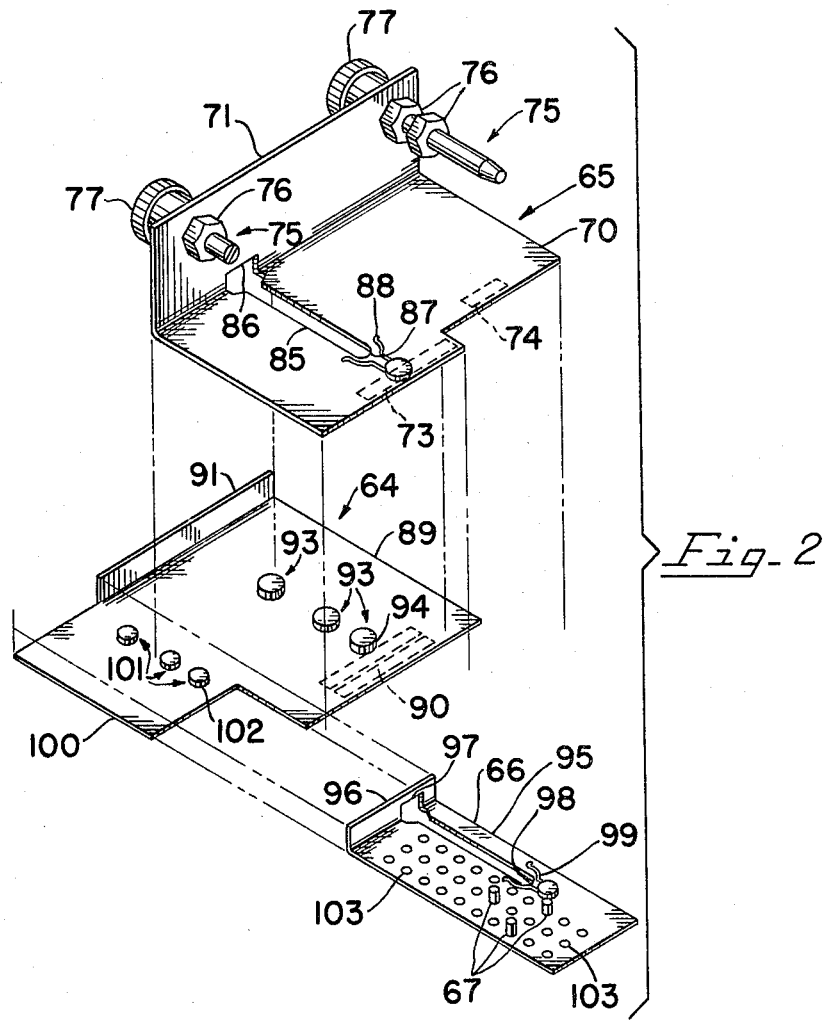
FIG. 2 is an exploded view in perspective of three printing plates two of which print the grade and name of the commodity being processed by the weighting scale shown in FIG. 1 and another of which selects the discrete logging locations in data logging means for listing the weight and retail value of such commodity.
Figure 3:
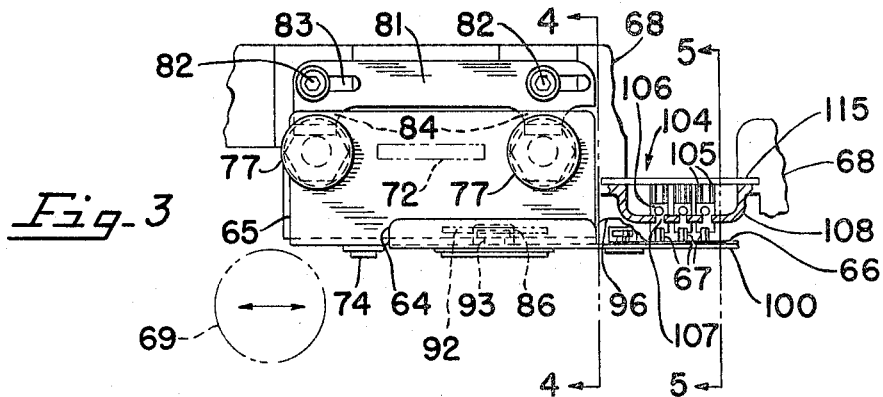
FIG. 3 is a front elevational view showing the three printing plates shown in FIG. 2 assembled in the computing weighing scale illustrated in FIG. 1.

FIG. 7 is an enlarged plan view of the switch board which is shown incorporated in the computing weighing scale in FIG. 3; and FIG. 8 is a block diagram illustrating a data logging computer which is coupled at A and B to receive weight and value data made available by the weighing scale system shown in FIG. 1 and which is coupled at C, D and E to the switch board shown in FIG. 7 for selecting the discrete logging locations in which weight and retail value data are listed.

Referring to the drawings, the computing weighing scale 11 as contemplated in this invention is provided with a scanner or reading device 10 that is adapted to generate a series of pulses proportional in number to the numerical value of the reading. The computing weighing scale 11 (illustrated in simplified form in FIG. 1) including weighing means, computing means and means for reading out the computer and the scanner 10 is shown in detail in the above U.S. Patent No. 3,055,585. These pulses are generated as independent, successive wave trains or trains of pulses and either may be generated continuously, i.e., one pulse train following the other after a short interval of time, or they may be generated in response to a starting or interrogating signal. An interrogating signal may be a demand made by a start button or other control for the reading device to execute a reading cycle, such signal being held up until an output on a lead 200 from a digital data logging computer 201 (FIG. 8) is received to prevent a new scan until data logging hereinafter described is finished.

The pulses generated in the reading device 10 are transmitted over a line 12 to a pulse shaper and wave train identifying mechanism 13 which in turn transmits pulses of sharp definite wave form over a line 14 to a multiplier pulse generator 15. The multiplier pulse generator 15 is used only in those installations or combinations where it is desired to indicate and/or record the product of the weight reading of the weighing scale times a selected price factor. The pulse generator 15 delivers to the counter lead 16 one pulse for each pulse received on the line 14. These pulses on the counter lead 16 are fed to a first decade 17 of a modified binary type counter which is composed of four decades including the decade 17 and other decades 18, 19, ant 20 adapted to register the units, tens, hundreds, and thousands places of the indication read by the reading device 10. The maximum counting and indicating capacity of the counter composed of the decades 17, 18, 19 and 20 is 9,999 counts. It should be realized that the units, tens, hundreds and thousands may represent decimal fractions as well as whole numbers and that a small weighing scale, for example, could be read to a thousandth of a weight unit, either pound or kilogram, or if larger and read to a hundredth of a unit, could indicate up to 99 units. At the completion of a weight reading by the reading device 10, the count accumulated in the counter comprising decades 17 to 20, inclusive, is transmitted through an output cable 21 which includes a plurality of leads from each counter decade (a total of thirty-two wires). The thirty-two wires are connected by means of a cable 202 to a cable 203 at A in FIG. 8. The voltages transmitted through the cable 21 also are transmitted to an indicating or recording device 22 which may provide on dials or number wheels a direct digital indication of the count and may also be arranged to position printing wheels so that printing impressions may be made directly from the indication. The indicating device 22 including gear means for setting up printing type wheels is shown and described in U.S. Patent No. 2,759,672, issued August 21, 1956, to C. S. Simonds et al.

The pulse generator 15 generates a predetermined number of voltage pulses for each received pulse and is arranged to provide for each pulse on the line 14 an output of two pulses on an output line 23, four pulses on an output line 24, two pulses on an output line 25, and one pulse on an output line 26. These are transmitted through a cable 27 to a diode switching matrix or combining network 28 referred to as a diode matrix. The pulses transmitted through the calbe 27 into the diode matrix 28 are combined therein to energize a set of nine leads appearing in a cable 29 in which the first lead carries a single pulse for each voltage pulse supplied to the pulse generator 15, a second carries two pulses, a third three, and so on up to nine. These leads are connected to selector switches included in a multiplier setting device 30 settable according to the price per unit of weight.

As many selector switches are employed as there are digits or places in the multiplier to be used. Thus, to provide prices per pound in a three unit decimal money system, such as the dollar, dime, and cent coinage in use in the U.S.A., requires three selector switches. The selector switches are connected to output leads 31, 32 and 33 which are carried through a cable 34 to combining amplifiers 35, 36 and 37 which transmit the pulses from the multiplier setting device 30 to corresponding decades of an electronic counting means 38 arranged to count the pulses representing the computed amount and comprising decades 39, 40, 41, 42, 43, and 44. In the example shown in FIG. 1, the weighing scale has a capacity suitable for retail use in which the minimum graduation is one one-hundredth of a United States unit of weight. Likewise, the multiplier set into the multiplier setting device 30 may be a price represented by dollars, dimes and cents. Since the minimum monetary unit to be indicated is the cent, the first two decades of the amount counting means or counter 38, i.e., the decades 39 and 40 which count the hundredths and tenths of cents, respectively, appearing in the product, are not connected into an indicating device but merely accumulate these fractional portions of a cent and transmit the accumulated portion into the next higher decade of the counting means 38.

The voltages in the decades 41 to 44, inclusive, representing the cents, dimes, dollars and tens of dollars of the computed amount or product are transmitted through a cable 45, containing eight leads for each decade (a total of thirty-two wires), to an amount indicator 46, which like the indicating device 22 is shown and described together with gearing for setting up printing type wheels in the foregoing noted U.S. Patent No. 2,759,672. The thirty-two wires also are connected by means of a cable 204 to a cable 205 at B in FIG. 8.

Since pulses are being transmitted from the pulse generator 15 through the diode matrix 28 and multiplier setting device 30 simultaneously to the leads 31, 32 and 33 and since these pulses are transmitted through the amplifiers 35, 36 and 37 into the counter decades 39, 40 and 41 simultaneously it is necessary, to prevent error, to delay any carry pulse from one decade to a following or higher place decade until after the transmission of pulses through the amplifiers 35, 36 and 37. Since the only place where such error could occur is in the decades that are fed from the amplifiers 36 and 37, arrangements are made so that the carry pulse from the decade 39 is transmitted through a lead 47 to a storage circuit 48 where it is held until the receipt by such storage circuit 48 of a clearing pulse from the pulse generator 15 by way of output terminal 49 and lead 50.

The clearing pulse from the output lead 49 transmitted through the lead 50 occurs once for each pulse transmitted by the lead 14 but occurs later in time than the pulses transmitted to the diode matrix 28 and factor setting device 30. If during the counting of a group of pulses from the diode matrix 28 the counter 39 exceeds its capacity and provides a carry pulse on lead 47, such pulse is stored and then transmitted upon receipt of the clearing pulse to the next amplifier 36 by way of lead 51 and then through such amplifier 36 into the next decade 40 of the amount counter 38. Likewise, carry pulses from the decade 40 are transmitted through a lead 52 to a second storage circuit 53. The carry circuit 53 thus is triggered or conditioned to transmit a pulse whenever it receives a carry pulse from the decade 40 and transmits such pulse upon the receipt of a clearing pulse received from output terminal 54 and transmitted through lead 55. Upon the receipt of the pulse from the output terminal 54 which occurs one unit of time, where a unit of time is the time spacing between pulses from the multiplier 15, after the pulse on the output terminal 49, the carry storage circuit 53, if conditioned by a carry pulse from the decade 40, transmits a pulse over a lead 56 to the combining amplifier 37 and thence to the counter decade 41.

The sequence or timing of the pulses from the pulse generator 15 is such that the output lead 23 transmits the first two pulses generated within the generator occurring during the first two units of time, the output lead 24 transmits the next four pulses occurring on the next four increments of time while the output lead 25 transmits the next two pulses occurring during the next two increments of time while the lead 26 transmits a single pulse occurring at the ninth unit of time. Next, the output terminal 49 transmits the tenth pulse and the output terminal 54 the eleventh pulse these occurring at generally equal intervals of time following the other pulses. The time spread between the pulses is sufficient so that, when a carry has occurred and such carry is stored in the carry storage circuit, for example, the circuit 48, the carry circuit may be tripped or energized by the pulse on the lead 49 and feed its pulse through the amplifier 36 into the decade 40 in time to clear that decade if it has counted to nine and is ready to transmit a carry pulse and have that carry pulse transmitted and stored in the carry circuit 53 in time to be transmitted, by triggering by a pulse from lead 54, so that the second circuit carry is accurately effected regardless of the particular condition in the electronic counting means.

In the operation, after a load is placed on the weighing scale a start signal is provided on a lead 57, which signal is transmitted to a sequence control 58 included in the reading station 59. The reading station 59 includes all of the structure enclosed in the dotted line including the indicators 22 and 46, the multiplier setting device 30, and the diode matrix 28. Upon receipt of the start signal on the line 57 the sequence control 58 transmits a pulse or signal over an output lead 60 leading to the reading device 10 causing it to start a scan. At the same time an unblocking signal is transmitted over a lead 61 to the amplifier and shaper stage so that this stage may transmit the pulses picked up from the reading device 10 and transmit them as properly shaped pulses over the lead 14 to the multiplier pulse generator 15.

Meanwhile, upon the receipt of the start signal on the lead 57 a reset signal is transmitted over lead 62 to each of the counter decades so as to set all of these decades to zero count in anticipation of the next reading. The one exception to the resetting to zero is the counter decade 40 of the amount counter which, in order to round off the nearest cent in value, is preset to a value of five representing a half cent. Therefore, as soon as a half cent or any number of cents plus a half cent has accumulated the cents counter decade 41 indicates the next cent in value thus rounding off the amount to the nearest cent.

Upon the receipt of an end of scan signal which may be transmitted over a lead 63 from the reading device 10 to the sequence control 58, the sequence control 58 through leads not shown in FIG. 1 energizes the visual indicating devices 22 and 46 so that they immediately scan the condition of the counter stages and position the indicating and printing wheels to positions corresponding to the counts then accumulated in the counter. Since this occurs after the end of the reading scan and since the electronic counters, both the weight indication counters 17 to 20 inclusive and the amount indication counters 41 to 44 inclusive, have reached their final indicating condition, the mechanical indicators 22 and 46 are ready to scan such counters and position themselves according to the indicated amounts.

Briefly, the reading device 10 generates a series of pulses one for each unit of weight. These pulses after proper shaping are transmitted through the pulse generator 15 which delivers a fixed number of pulses on each of several of a plurality of leads for each received pulse. That output lead of the pulse generator which transmits the last pulse generated therein is connected to the electronic counter comprising decade 17, 18, 19 and 20 adapted to count the actual number of pulses transmitted from the reading device 10. The pulse is taken from the last stage of the pulse generator rather than the input lead 14 as a safety feature because, when so connected, there can be no indication of either weight or amount unless the pulse generator 15 is functioning properly.

The pulses, i.e., the fixed number of pulses generated in the pulse generator 15 for each pulse in the series of pulses from the reading device 10, are transmitted through the combining matrix 28 to the selector switches in the factor setting device 30 and the selected pulses constituting a predetermined number are transmitted through the amplifiers connected to the first few decades of the amount counter 38. These are totaled in the amount counter 38 which, with indicator 46, indicates the product of the reading of the condition responsive member as read by the reading device 10 and multiplied by the selected price factor set into the factor setting device 30.

The computing weighing scale is constructed as a unit with printing apparatus which is shown and described in U.S. Patent No. 3,122,995, issued March 3, 1964, in the names of C. E. Adler and F. C. Carroll. The scale and the printing apparatus weighs commodities and issues a printed ticket, label or the like bearing thereon the net weight, price per pound, and computed value of a weighed commodity together with such variable data as the date, store code, commodity name, and commodity grade. Printing type wheels in the printing apparatus are set up by the above noted gearing connected to the indicating devices 22 and 46 for printing the weight reading shown as an example in FIG. 1 as 16.43 pounds on the indicating device 22 and for printing the value reading (weight times the price factor set into the factor setting device 30) shown as an example in FIG. 1 as $29.41. The commodity name and grade are printed from printing plates 64 and 65, respectively, as shown and described in the above U.S. Patent No. 2,953,989.

The selection of the address for the digital computer 201 is accomplished, according to the invention, by means of a detachably mounted plate 66 carrying pins 67 which function as hereinafter described.

Figure 4:
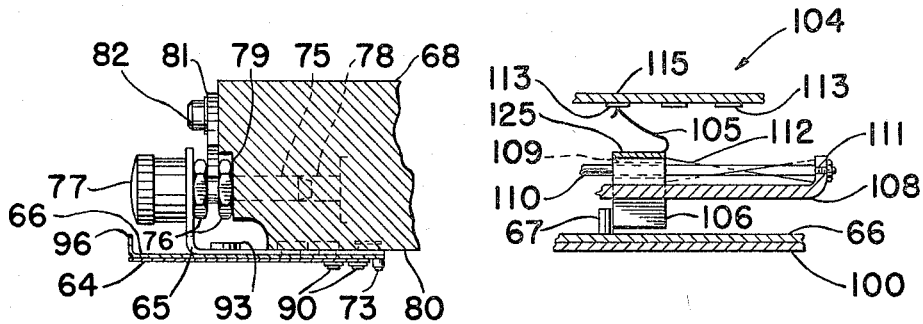
FIG. 4 is a vertical sectional view taken along the line 4—4 of FIG. 3.
Figure 6:
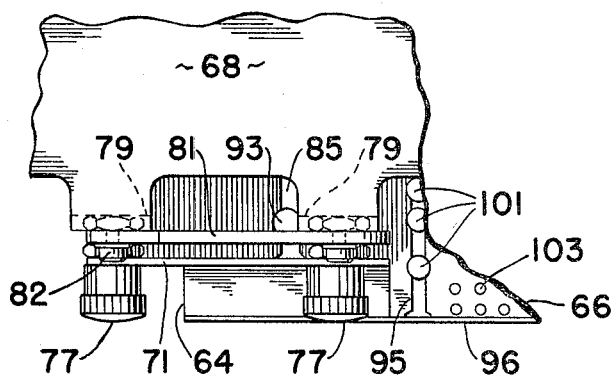
FIG. 6 is a fragmentary plan view of the apparatus shown in FIG. 3.

The printing plates 65 and 64 are shown at a printing station in FIGS. 3, 4 and 6 in operative positions in a frame 68 of a printer which for the purpose of illustration can be considered to be the printer for tickets, labels or the like which is shown and described in the foregoing U.S. Patent No. 3,122,995. Tickets or labels (not shown) are pressed against the printing plates after they are inked as described in the patent by a platen roller 69 as also described in the patent.

Printing plate 65 functions both as a printing means and as a holder for the other printing plate 64; it includes a flat printing plate supporting portion 70 a part or edge 71 of which is bent or turned up out of the plane of the supporting portion 70. The bent part 71 of the printing plate 65, which is the front portion of the plate, functions as a place to put identification indicia 72 which correspond to the printing type 73 carried by the supporting portion 70 of the printing plate. These type 73 can be made, for example, of rubber, metal or plastic and can be formed integrally with the plate or made separately and attached by means of an adhesive and are used to print the grade of beew being prepacked, such grades being U.S. Prime, Choice, God, Utility and Commercial. For commodities, such as cheese or luncheon meat, which are not graded the area on the plate occupied by the type 73 is left blank. Hence, six of the printing plates 65 are needed for a complete set, five for the five grades of beef and one for the blank, and are termed "commodity grade printing plates." The commodity grade printing plate 65 also carries type 74 for printing a store code.

The bent part or front portion 71 of the printing plate 65 also functions as a support for a pair of locating and latch pins 75 each of which includes a portion which extends through the front portion 71 of the printing plate 65 to receive a knob handle 77. The pins 75 are received in horizontal openings 78 in the frame 68 with the shoulders 76 that are remote from the handles 77 against abutment surfaces 79 of the frame to accurately locate the type 73 and 74 in the printer and with the upper surface of the type bearing portion 70 of the printing plate 65 against an abutment surface 80 of the frame 68 to impart stability to the printing plate 65. It is vital that the printing type 73 and 74 be accurately located in the printer so that no overlapping of the various printed matter occurs, the printer printing and issuing a ticket or label bearing thereon the net weight, price per pound, and computed value of a weighed commodity together with such variable data as the date, store code, commodity name, and commodity grade.

A slide keeper 81 supported on the shoulders of shoulder screws 82 carried by the frame 78 above the abutment surfaces 79 of the frame is selectively slidable between a locked and an unlocked position as determined by the length of slots 83 in the keeper that cooperate with the shoulder screws 82. In the locked position which is shown in FIGS. 3, 4 and 6, tongues 84 on the slide keeper 82 are received in a tight fit between the spaced shoulders 76 on the pins 75 to hold the commodity grade printing plate 65 in place, the printing plate 65 being readily removable from the frame 68 of the printer by sliding the keeper 81 to its unlocked position and withdrawing the pins 75 from the openings 78 in the frame.

The commodity grade printing plate 65 which functions additionally as a holder for the commodity name printing plate 64 is provided with a slot 85 which extends from the front portion 71 of the plate 65 toward the printing type 73 on the plate, the slot 85 being transverse to such type 73 and having an enlarged open end 86 at the front portion 71 and a closed end 87 remote from the front portion 71. A spring clip or keeper 88 is secured to the type bearing portion 70 of the plate 65 at the closed end of the slot with its open mouth facing the slot, the spring clip 88 being on the upper surface of the type bearing portion 70 and the type 73 being on the lower surface of the type bearing portion 70.

The printing plate 64 includes a flat portion 89 bearing type 90 for printing the commodity name a minor part or front portion 91 of which type bearing portion is bent out of the plane of the type bearing portion and which is suitable for use as a handle and as a place to put identification indicia 92 corresponding to the type 90. Three shouldered guide and lock pins 93 are carried by the upper surface of the type bearing portion 89 of the printing plate, the lower surface of the type bearing portion 89 being the surface on which the type 90 are located, in a straight row which extends transverse to the front portion 91 of the plate and to the type 90 on the plate.

The printing plate 64 is inserted in the holder 65 by inserting the first one of the pins 93 in the enlarged open end 86 of the slot 85 and then the other two of the pins until such first pin contacts the closed end 87 of the slot. The edges of the printing plate 65 along the slot 85 fit snugly between the shoulders on the pins 93 and the upper surface of the type bearing portion 89 of the printing plate 64. A head 94 on such first one of the pins 93 expands the spring clip 88 as it approaches the closed end 87 of the slot 85, the clip resiliently returning to its original position to embrace the head 94 when the printing plate 64 is inserted fully in its holder 65 to retain the plate 64 in the holder in a readily removable condition. In the inserted position, the type 90 on the printing plate 64 are juxtaposed to the type 73 on the holder or commodity grade printing plate 65 in an accurately located position, the type 73 printing the grade of the beef being prepackaged and the type 90 printing the name of the cut of the beef being prepackaged. Hence, the printing plate 64 is termed "commodity name printing plate." The commodity name printing plate 64 can be readily removed from the printer either by sliding it out of the slot 85 in the commodity grade printing plate or holder 65 or by removing the holder 65 from the frame 68 of the printer as hereinbefore described.

In operation, in processing a side of beef, a commodity grade printing plate or holder 65 is chosen which corresponds to the grade of the beef being processed. The identification indicia 72 aid in the selection. The printing plate or holder 65 is locked in the printer by means of the slide keeper 81, the shoulders 76 remote from the handles 77 on the pins 75 locating the holder accurately relative to the printing station in operative position and the slide keeper locking the holder in such position. The type 73 carried by the holder print the grade of the beef, the holder being left in the printer as long as the grade of the beef being prepackaged remains unchanged.

Commodity name printing plates 64 are substituted one for the other in the holder 65 in operative positions accurately located, by means including the closed end 87 of the slot 85 in the holder, relative to the printing station as the various cuts of beef are prepackaged. Type 90 carried by the printing plates 64 print information of a second kind, i.e., the names of the cuts of beef. Since the commodity name plates 64 are readily detachable from the holder 65, a relatively large number of combinations of the two kinds of information can be printed from a relatively small number of printing plates.

In processing commodities which do not have grades, such as cheese and luncheon meat, a holder 65 is chosen which does not carry printing type, i.e., it is a blank. Commodity name printing plates 64 are substituted one for the other in the holder 65 as the various commodities are prepackaged.

The plate 66 is provided with a slot 95 which extends from a bent-up front portion 96 of the plate 66, the slot 95 having an enlarged open end 97 at the front portion 96 and a closed end 98 remote from the front portion 96. A spring clip or keeper 99 is secured to the plate 66 at the closed end of the slot 95 with its open mouth facing the slot, the spring clip 99 being on the upper surface of the plate 66.

The printing plate 64 includes a flat extension 100 carrying three shoulders guide and lock pins 101 on its upper surface in a straight row extending transverse to the front portion 91 of the plate. The plate 66 is inserted or clipped in the commodity name printing plate 64 by inserting the first one of the pins 101 in the enlarged open end 97 of the slot 95 and then the other two of the pins until such first pin contacts the closed end 98 of the slot. The edges of the plate 66 along the slot 95 fit snugly between the shoulders on the pins 101 and the upper surface of the plate extension 100. A head 102 on such first one of the pins 101 expands the spring clip 99 as it approaches the closed end 98 of the slot 95, the clip resiliently returning to its original position to embrace the head 102 when the plate 66 is inserted fully to retain the plate 66 in a readily removable condition.

The electronic digital computer 201 (FIG. 8) has internal programming, an arithmetic unit, a storage section and an input-output writer in the form of an electric typewriter. The computer 201 can perform the basic arithmetic operations of add, subtract, multiply and divide. Programming is controlled by plugboards and each program may consist of up to fifty-two steps and is performed by a stepping switch. However, any suitable device which will list and add can be used. The computer 201 functions to list and add the weight and retail value of all packages of a certain kind or class of commodity processed by the computing weighing scale system, i.e., the computer is automatically operable means for logging data relating to the commodities being processed by such system. The data logging means is coupled at A and B (FIG. 8) to the computing weighing scale system (FIG. 1) and, in accordance with the invention, commodity plate selection of address for the data logging means is provided, the name of the commodity being processed corresponding to the address for data logging. The computer 201 reads out on command the weight and retail value of all the packages of a certain kind or class of commodity. A feature of the invention resides in both setting up the commodity name printing type and selecting the address for the computer 201 by inserting the commodity name plate 64 into the computing and recording means as described above. The operator, for example, by merely placing in the computing scale the "Sirloin Steak" commodity printing plate 64, automatically sets up the printer to print "Sirloin Steak" and selects, by means of the pins 67 carried by the plate 64, the correct discrete logging locations in the data logging computer for listing the weight and retail value of all the packages processed by the system during the time that the "Sirloin Steak" commodity printing plate remains in the scale.

The pins 67 are switch operators and are arranged in holes 103 in the plate 66 in a pattern in accordance with the name of the commodity printed by the plate 64. There are three straight, parallel rows of the holes 103. Each row has ten holes and extends transverse to the front plate portion 96. The hole 103 in each of the rows most remote from the front plate portion 96 is the number one hole, the hole next adjacent the number one hole in each of the rows is the number two hole, etc. The last hole in each of the rows is used for zero. Conceivably, the switch operators could be constructed in other ways; for example, instead of pins set in holes, tabs could be bent up out of the material of the plate 66 itself in a particular pattern.

Figure 5:
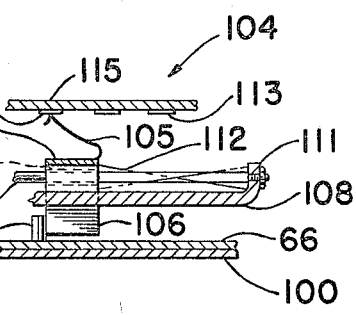
FIG. 5 is a vertical sectional view taken along the line 5—5 of FIG. 3.

The pins 67 operate three selector switches 104 each of which includes a pair of movable brushes 105 carried by a slider 106 slidably mounted in slot 107 in a bracket 108 carried by the frame 68. The three slots 107 are parallel to each other and parallel to the rows of holes 103 in the plate 66 when the plate 66 is in operative position as shown in FIGS. 3 and 6. As shown in FIG. 3, the sliders 106 are grooved to provide horizontal surfaces which are slidable on the bracket 108 and each is movable in a path which is slightly above and in registry with a corresponding one of a row of plate holes 103 when the plate 66 is in printing position. Each of the sliders 106 is provided with a horizontal hole 109 (FIG. 5) which receives a stationary pin 110 carried by a turned-up end 111 of the bracket 108. A return coil spring 112 surrounds the pin 110 and is compressed between the slider 106 and the bracket end 111. The sliders 106 are slidable on the pins 110.

Each of the three selector switches 104 also includes a straight row of ten contacts 113 (FIG. 7) and a common strip contact 114 mounted on a switch board 115. The contacts in each of the three sets of contacts 113 are connected by means of cables 116–118, each carrying ten wires one for each of the contacts, to corresponding cables 119–121 (FIG. 8) at C, D and E, respectively, which carry input signals to the computer 201. Common contacts 114 are connected to input leads 122–124 which are connected to any suitable source, e.g., they can be energized from the computer 201 itself. The switch board 115 is supported in a horizontal position on the bracket 108 as shown in FIG. 3. There is a contact 113 for each of the holes 103 in the plate 66.

The selector switches 104 are operated by the switch-operating pins 67. Insertion of the commodity name plate 64 into the printer carries the plate 66 into operative position. In moving to such position, the pins 67 on the plate 66 engage the sliders 106 and slide them in opposition to the return springs 112 a distance depending on the locations of the pins 67 in the holes 103. Removal of the plates 64 and 66 from the printer permits the return springs 112 to move the selector switches 104 to blank position, i.e., off of the contacts 113. One of the two brushes 105 in each of the pair of brushes engages its common contact 114 and the other one of such pair of brushes engages one of its ten contacts 113 when the plates 64 and 66 are in printing position. This completes a circuit from the common contact 114 through a brush-connecting plate 125 atop the slider 106 to the engaged one of the ten contacts 113.

The contacts in each of the three sets of contacts 113 are used for deciding which discrete logging locations are to be used in listing the data, such data being any information, such as weight and/or retail value, furnished by the computing weighing scale. The discrete logging locations in which such data are listed can be any heading or headings relating to the commodities. For example, the contacts in the first set of contacts 113 (vertical row) shown in FIG. 7 can relate to dairy products, poultry, pork, beef, etc.; the contacts in the next set of contacts 113 can relate to meat cuts such as roasts, steaks, etc.; the contacts in the last set of contacts 113 can relate to meat cuts such as rib, sirloin, etc. As a specific example, the bottom three contacts 113 can relate to "Beef," "Steak" and "Sirloin," respectively. The pins 67 are then arranged in the holes 103 in the plate 66 carried by the "Sirloin Steak" commodity plate 64 so that when the commodity plate 64 is inserted into operative position in the printer the sliders 106 are driven to positions in which such bottom three contacts 113 are closed. This completes a circuit from the common contacts 114 to the engaged ones of the contacts 113 producing a hot address wire in each of the cables 119–121 (FIG. 8) which are connected to the computer 201. Weight and value data made available to the computer 201 then are listed in a discrete logging location in accordance with which address wires are hot, i.e., weight and value data are listed under "Beef Sirloin Steak" in the computer 201 for as long as this particular commodity plate remains in the machine. When the commodity plate is replaced by another, the new plate will carry a set of three pins arranged in a pattern in accordance with the new commodity name. The operator, by merely placing in the computing scale the plate which corresponds to the product being processed, automatically sets up the printer to print the name of such product and also selects the correct discrete logging locations in the computer for listing the weight and retail value of all the packages processed by the system during the time that such commodity printing plate remains in the scale. That is, when a commodity name plate is in the machine, there is a hot wire in each of the three sets of ten wires in the cables 119–121 (FIG. 8), which hot wires are in accordance with the particular one of the many commodity plates that presently is being used. The printing type 90 carried by the commodity plate in the machine prints the name of the commodity. The total weight and retail value of each kind or class of commodity are read out on command at any time.

As hereinbefore described, thirty-two wires are connected by means of the cable 202 (FIG. 1) to the cable 203 at A in FIG. 8 and thirty-two wires are connected by means of a cable 204 (FIG. 1) to the cable 205 at B in FIG. 8. These binary signals are applied to decimal converters 226 and 227, respectively, which can be of any type compatible with the particular data logging computer 201 which is used. The "Weight" signal cable 228 (FIG. 8) contains ten wires per decade and the "Value" signal cable 229 also contains ten wires per decade. There is simultaneous entry of all decades (decimal and parallel) to the computer through the cables 228 and 229 which supply weight and value data to the computer. The computer program is started by an input signal through a lead 230 after label printing is initiated, the computer entering the weight and value data in locations determined by the hot ones of the wires in the cables 119–121.

In operation, the supervisor in a pre-packing operation sets up the pins 67 carried by the commodity plates 64 so that the three selector switches 104 are operable in accordance with the names of the commodities. From then on, selection of address for data logging is accomplished automatically by changing the commodity plates, such plates functioning additionally to print the names of the commodities.

It is to be understood that the above description is illustrative of this invention and that various modifications thereof can be utilized without departing from its spirit and scope.

Having described the invention, I claim:

1. A computing weighing scale system comprising, in combination, first means for weighing a commodity, computing the value of the commodity according to its weight and a selected price and recording the value, printing type for printing the name of the commodity, second means for logging data made available by said first means relating to the commodity, the name of the commodity corresponding to the address for data logging, and a commodity name plate for both setting up the printing type and selecting the address for the second means.

2. A computing weighing scale system according to claim 1 wherein the printing type are borne by the plate and the plate moves the printing type into printing position and selects the data logging address simultaneously.

3. A computing weighing scale system comprising, in combination, a first computer for computing the values of commodities according to their weight factors and selected price factors, means for setting up the weight factors and the selected price factors in the first computer, printing means for printing the names of the commodities, a second computer for logging data relating to the commodities in groups correspondnig to the different commodities, the names of the commodities corresponding to the addresses for data logging, and a commodity name plate corresponding to the commodity being processed for both setting up the printing means and selecting the address for the second computer.

4. A computing weighing scale system according to claim 3 wherein the commodity name plate bears coded elements corresponding to the name for selecting the address for the second computer and also bears type for printing said name.

5. A weighing scale system comprising, in combination, data logging means for listing and adding, weighing scale means for furnishing weight information to said data logging means, and a detachably mounted printing plate for printing the name of the commodity being processed and bearing coded elements corresponding to said name of the commodity being processed for selecting discrete logging locations in the data logging means in which said information is to be listed.

6. A weighing scale system comprising, in combination, data logging means for listing and adding, weighing scale means for furnishing weight information to said data logging means, selector switch means in circuit with the data logging means for selecting discrete logging locations in the data logging means in which said information is to be listed, and a detachably mounted commodity name printing plate for printing the name of the commodity being processed and carrying coded switch operators for operating the selector switch means in accordance with said name of the commodity being processed.

7. A computing weighing scale system comprising, in combination, means for weighing a commodity, computing the value of the commodity according to its weight and a selected price and recording the value, data logging means coupled to said means, selector switch means in circuit with the data logging means for selecting discrete logging locations, and a commodity name plate for both printing the name of the commodity and controlling the selector switch means.

8. A computing weighing scale system comprising, in combination, first means for weighing a commodity, computing the value of the commodity according to its weight and a selected price and recording the value, printing type for printing the name of the commodity, second means for logging and adding data made available by said first means relating to the commodity, and commodity name means for both setting up the printing type and providing information for the second means identifying the logged data in accordance with the respective commodity name.

9. A weighing scale system comprising, in combination, first means for weighing and recording the weight of a commodity, printing type for printing the name of the commodity, second means for logging and adding weight data made available by said first means relating to the commodity, and commodity name means for both setting up the printing type and providing information for the second means identifying the logged weight data in accordance with the respective commodity name.

References Cited by the Examiner

UNITED STATES PATENTS 2,948,465    8/1960    Allen _____ 235—58

RICHARD B. WILKINSON, *Primary Examiner.*